United States Patent
Panwar (10) Patent No.: US 8,804,950 B1
(45) Date of Patent: Aug. 12, 2014

(54) METHODS AND APPARATUS FOR PRODUCING A HASH VALUE BASED ON A HASH FUNCTION

(75) Inventor: Ramesh Panwar, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1412 days.

(21) Appl. No.: 12/242,158

(22) Filed: Sep. 30, 2008

(51) Int. Cl.
| | |
|---|---|
| H04K 1/00 | (2006.01) |
| H04L 9/00 | (2006.01) |
| H04L 9/28 | (2006.01) |
| G06F 7/00 | (2006.01) |
| G06F 17/00 | (2006.01) |
| H04L 9/06 | (2006.01) |
| G06F 12/08 | (2006.01) |
| G06F 12/10 | (2006.01) |
| G06F 17/30 | (2006.01) |

(52) U.S. Cl.
CPC .............. *H04L 9/06* (2013.01); *G06F 12/0864* (2013.01); *G06F 12/1018* (2013.01); *G06F 17/30949* (2013.01)
USPC ............................................ 380/28; 707/698

(58) Field of Classification Search
CPC ... H04L 9/06; G06F 12/0864; G06F 12/1018; G06F 17/30949
USPC ............................................ 380/28; 707/698
See application file for complete search history.

(56) References Cited

U.S. PATENT DOCUMENTS

| | | | |
|---|---|---|---|
| 4,215,402 A | 7/1980 | Mitchell et al. | |
| 5,463,777 A | 10/1995 | Bialkowski et al. | |
| 5,473,607 A | 12/1995 | Hausman et al. | |
| 5,495,476 A | 2/1996 | Kumar | |
| 6,073,160 A | 6/2000 | Grantham et al. | |
| 6,157,955 A | 12/2000 | Narad et al. | |
| 6,212,184 B1 | 4/2001 | Venkatachary et al. | |
| 6,226,629 B1 | 5/2001 | Cossock | |
| 6,266,705 B1 | 7/2001 | Ullum et al. | |
| 6,457,058 B1 | 9/2002 | Ullum et al. | |
| 6,587,466 B1 | 7/2003 | Bhattacharya et al. | |
| 6,600,741 B1 | 7/2003 | Chrin et al. | |
| 6,600,744 B1 | 7/2003 | Carr et al. | |
| 6,614,789 B1 | 9/2003 | Yazdani et al. | |
| 6,618,397 B1 | 9/2003 | Huang | |
| 6,654,373 B1 | 11/2003 | Lie et al. | |
| 6,658,482 B1 | 12/2003 | Chen et al. | |
| 6,665,274 B1 | 12/2003 | Yamada | |
| 6,675,163 B1 | 1/2004 | Bass et al. | |
| 6,704,871 B1 * | 3/2004 | Kaplan et al. | 713/192 |

(Continued)

OTHER PUBLICATIONS

New Hash Functions for Message Authentication—Hugo Krawczyk L.C. Guillou and 1.-1. Quisquater (Eds.): Advances in Cryptology—EUROCRYPT '95, LNCS 921, pp. 301-310, 1995. © Springer-Verlag Berlin Heidelberg 1995.*

(Continued)

*Primary Examiner* — Kambiz Zand
*Assistant Examiner* — Benjamin Kaplan
(74) *Attorney, Agent, or Firm* — Cooley LLP (57) ABSTRACT

In one embodiment, a method includes receiving a bit value from a key vector. The bit value has a position within the key vector correlating to a counter value. The method includes receiving a sequence of bit values from a plurality of predefined bit values based on the counter value and in response to a condition associated with the bit value from the key vector being satisfied.

29 Claims, 6 Drawing Sheets

(56) References Cited

U.S. PATENT DOCUMENTS

| | | | |
|---|---|---|---|
| 6,721,316 B1 | 4/2004 | Epps et al. | |
| 6,731,631 B1 | 5/2004 | Chang et al. | |
| 6,731,644 B1 | 5/2004 | Epps et al. | |
| 6,735,670 B1 | 5/2004 | Bronstein et al. | |
| 6,754,662 B1 | 6/2004 | Li | |
| 6,778,532 B1 | 8/2004 | Akahane et al. | |
| 6,778,546 B1 | 8/2004 | Epps et al. | |
| 6,778,984 B1 | 8/2004 | Lu et al. | |
| 6,789,118 B1 | 9/2004 | Rao | |
| 6,813,243 B1 | 11/2004 | Epps et al. | |
| 6,859,455 B1 | 2/2005 | Yazdani et al. | |
| 6,862,278 B1 | 3/2005 | Chang et al. | |
| 6,889,225 B2 | 5/2005 | Cheng et al. | |
| 6,917,946 B2 | 7/2005 | Corl, Jr. et al. | |
| 6,925,085 B1 | 8/2005 | Krishna et al. | |
| 6,940,862 B2 | 9/2005 | Goudreau | |
| 6,947,931 B1 | 9/2005 | Bass et al. | |
| 6,977,930 B1 | 12/2005 | Epps et al. | |
| 7,042,878 B2 | 5/2006 | Li | |
| 7,089,240 B2 | 8/2006 | Basso et al. | |
| 7,133,400 B1 | 11/2006 | Henderson et al. | |
| 7,136,926 B1 | 11/2006 | Iyer et al. | |
| 7,173,931 B2 | 2/2007 | Chao et al. | |
| 7,190,696 B1 | 3/2007 | Manur et al. | |
| 7,193,997 B2 | 3/2007 | Van Lunteren et al. | |
| 7,227,842 B1 | 6/2007 | Ji et al. | |
| 7,233,568 B2 | 6/2007 | Goodman et al. | |
| 7,233,579 B1 | 6/2007 | Crump et al. | |
| 7,277,429 B2 | 10/2007 | Norman et al. | |
| 7,304,992 B2 | 12/2007 | Relan | |
| 7,317,723 B1 | 1/2008 | Guru | |
| 7,325,074 B2 | 1/2008 | McRae | |
| 7,349,415 B2 | 3/2008 | Rangarajan et al. | |
| 7,356,033 B2 | 4/2008 | Basu et al. | |
| 7,369,561 B2 | 5/2008 | Wybenga et al. | |
| 7,373,345 B2 | 5/2008 | Carpentier et al. | |
| 7,382,637 B1 | 6/2008 | Rathnavelu et al. | |
| 7,382,777 B2 | 6/2008 | Irish et al. | |
| 7,382,876 B2 | 6/2008 | Lauter et al. | |
| 7,383,244 B2 | 6/2008 | Bass et al. | |
| 7,394,809 B2 | 7/2008 | Kumar et al. | |
| 7,403,524 B2 | 7/2008 | Hill | |
| 7,403,526 B1 | 7/2008 | Zou et al. | |
| 7,403,999 B2 | 7/2008 | Corl, Jr. et al. | |
| 7,418,505 B2 | 8/2008 | Lim et al. | |
| 7,424,744 B1 | 9/2008 | Wu et al. | |
| 7,441,268 B2 | 10/2008 | Remedios | |
| 7,480,302 B2 | 1/2009 | Choi | |
| 7,525,958 B2 | 4/2009 | Kumar et al. | |
| 7,543,052 B1 | 6/2009 | Cesa Klein | |
| 7,602,787 B2 | 10/2009 | Cheriton | |
| 7,610,330 B1 | 10/2009 | Quinn et al. | |
| 7,613,209 B1 * | 11/2009 | Nguyen et al. | 370/474 |
| 7,646,771 B2 | 1/2010 | Guru et al. | |
| 7,668,160 B2 | 2/2010 | Narayan et al. | |
| 7,738,454 B1 | 6/2010 | Panwar et al. | |
| 7,796,541 B1 | 9/2010 | Goel et al. | |
| 7,835,357 B2 | 11/2010 | Panwar et al. | |
| 7,889,741 B1 | 2/2011 | Panwar et al. | |
| 7,974,996 B1 * | 7/2011 | North et al. | 708/495 |
| 8,111,697 B1 | 2/2012 | Panwar et al. | |
| 8,139,591 B1 | 3/2012 | Goel et al. | |
| 2002/0138648 A1 | 9/2002 | Liu | |
| 2002/0152209 A1 | 10/2002 | Merugu et al. | |
| 2002/0191605 A1 | 12/2002 | Lunteren et al. | |
| 2003/0023846 A1 | 1/2003 | Krishna et al. | |
| 2003/0030575 A1 | 2/2003 | Frachtenberg et al. | |
| 2003/0053460 A1 | 3/2003 | Suda et al. | |
| 2003/0059045 A1 | 3/2003 | Ruehle | |
| 2003/0156586 A1 | 8/2003 | Lee et al. | |
| 2003/0219017 A1 | 11/2003 | Davis et al. | |
| 2003/0223424 A1 | 12/2003 | Anderson et al. | |
| 2003/0233516 A1 | 12/2003 | Davis et al. | |
| 2004/0015599 A1 | 1/2004 | Trinh et al. | |
| 2004/0028046 A1 | 2/2004 | Govindarajan et al. | |
| 2004/0086117 A1 * | 5/2004 | Petersen et al. | 380/44 |
| 2004/0095936 A1 | 5/2004 | O'Neill et al. | |
| 2004/0100950 A1 | 5/2004 | Basu et al. | |
| 2004/0100959 A1 | 5/2004 | Relan | |
| 2004/0105422 A1 | 6/2004 | Sahni et al. | |
| 2004/0190526 A1 | 9/2004 | Kumar et al. | |
| 2004/0254909 A1 | 12/2004 | Testa | |
| 2004/0258067 A1 | 12/2004 | Irish et al. | |
| 2004/0264373 A1 | 12/2004 | Engbersen et al. | |
| 2005/0083935 A1 | 4/2005 | Kounavis et al. | |
| 2005/0141510 A1 | 6/2005 | Narsinh et al. | |
| 2005/0146449 A1 | 7/2005 | Adl-Tabatabai et al. | |
| 2005/0195832 A1 * | 9/2005 | Dharmapurikar et al. | 370/395.31 |
| 2005/0226235 A1 | 10/2005 | Kumar et al. | |
| 2005/0232261 A1 | 10/2005 | Wybenga et al. | |
| 2005/0237938 A1 | 10/2005 | Corl, Jr. et al. | |
| 2006/0050690 A1 | 3/2006 | Epps et al. | |
| 2006/0053295 A1 * | 3/2006 | Madhusudan et al. | 713/181 |
| 2006/0083247 A1 | 4/2006 | Mehta | |
| 2006/0136725 A1 * | 6/2006 | Walmsley | 713/171 |
| 2006/0195896 A1 | 8/2006 | Fulp et al. | |
| 2006/0218167 A1 | 9/2006 | Bosley et al. | |
| 2006/0221954 A1 | 10/2006 | Narayan et al. | |
| 2006/0221956 A1 | 10/2006 | Narayan et al. | |
| 2006/0221967 A1 | 10/2006 | Narayan et al. | |
| 2007/0008962 A1 | 1/2007 | Basu et al. | |
| 2007/0070900 A1 | 3/2007 | Heink et al. | |
| 2007/0071233 A1 | 3/2007 | Zak | |
| 2007/0115986 A1 | 5/2007 | Shankara | |
| 2007/0133593 A1 | 6/2007 | Shankara | |
| 2007/0234005 A1 | 10/2007 | Erlingsson et al. | |
| 2007/0244951 A1 * | 10/2007 | Gressel et al. | 708/252 |
| 2007/0283045 A1 | 12/2007 | Nguyen et al. | |
| 2008/0052300 A1 | 2/2008 | Horgan | |
| 2008/0162698 A1 | 7/2008 | Hopen et al. | |
| 2008/0177812 A1 | 7/2008 | Brandle | |
| 2008/0186974 A1 | 8/2008 | Singh et al. | |
| 2008/0205403 A1 | 8/2008 | Akyol et al. | |
| 2008/0205405 A1 | 8/2008 | Corl et al. | |
| 2008/0212586 A1 | 9/2008 | Wang et al. | |
| 2008/0228798 A1 | 9/2008 | Van Lunteren | |
| 2008/0298582 A1 * | 12/2008 | Sakai | 380/44 |
| 2009/0037500 A1 * | 2/2009 | Kirshenbaum | 707/206 |
| 2009/0041236 A1 * | 2/2009 | Gligoroski et al. | 380/43 |
| 2009/0043993 A1 * | 2/2009 | Ford et al. | 712/216 |
| 2009/0196297 A1 | 8/2009 | Jabr | |
| 2010/0040067 A1 | 2/2010 | Hao et al. | |
| 2010/0080224 A1 | 4/2010 | Panwar et al. | |
| 2010/0083345 A1 | 4/2010 | Panwar et al. | |
| 2010/0185680 A1 * | 7/2010 | Gilboa | 707/802 |
| 2011/0134916 A1 | 6/2011 | Panwar et al. | |
| 2011/0200038 A1 | 8/2011 | Panwar et al. | |

OTHER PUBLICATIONS

Linear Hashing : A New Tool for File and Table Addressing. Witold Litwin © 1980 IEEE.*

CS 373 Lecture 6: Hash Tables Fall 2002.*

Office Action mailed Feb. 17, 2010 for U.S. Appl. No. 12/242,168 (12 pages).

Office Action mailed Feb. 16, 2010 for U.S. Appl. No. 12/242,172 (11 pages).

Office Action mailed May 10, 2010 for U.S. Appl. No. 12/242,143 (23 pages).

Office Action mailed Apr. 23, 2010 for U.S. Appl. No. 12/347,495 (11 pages).

Office Action mailed Jun. 10, 2010 for U.S. Appl. No. 12/242,278, filed Sep. 30, 2008 (24 pages).

U.S. Appl. No. 12/242,143, filed Sep. 30, 2008, entitled "Methods and Apparatus for Compression in Packet Classification" (34 pgs).

U.S. Appl. No. 12/242,125, filed Sep. 30, 2008, entitled "Methods and Apparatus for Range Matching During Packet Classification Based on a Linked-Node Structure" (39 pgs).

U.S. Appl. No. 12/242,278, filed Sep. 30, 2008, entitled "Methods and Apparatus to Implement Except Condition During Data Packet Classification" (35 pgs).

(56) References Cited

OTHER PUBLICATIONS

U.S. Appl. No. 12/794,175, filed Jun. 4, 2010 entitled "Methods and Apparatus Related to Packet Classification Based on Range Values" (42 pgs).
U.S. Appl. No. 12/347,495, filed Dec. 31, 2008 entitled "Methods and Apparatus for Packet Classification Based on Multiple Conditions" (40 pgs).
U.S. Appl. No. 12/347,499, filed Dec. 31, 2008 entitled "Methods and Apparatus for Packet Classification Based on Multiple Conditions" (41 pgs).
U.S. Appl. No. 12/347,418, filed Dec. 31, 2008 entitled "Methods and Apparatus for Indexing Set Bit Values in a Long Vector Associated with a Switch Fabric" (35 pgs).
Itamar Elhanany et al. "High-performance Packet Switching Architectures" Springer Science & Business Media, ISBN-10: 184628273X, 2002, Chapter 10, 20 pages.
H. Jonathan Chao et al. "Matching Algorithms for Three-Stage Bufferless Clos Network Switches" IEEE Communications Magazine, Oct. 2003, pp. 46-54.
Office Action mailed May 24, 2011 for U.S. Appl. No. 12/874,681, filed Sep. 2, 2010 (21 pages).
Final Office Action mailed Dec. 17, 2010 for U.S. Appl. No. 12/242,143 (38 pages).
Office Action mailed Sep. 26, 2011 for U.S. Appl. No. 12/242,143 (40 pages).
Final Office Action mailed Apr. 30, 2012 for U.S. Appl. No. 12/242,143 (37 pages).
Office Action mailed Sep. 26, 2011 for U.S. Appl. No. 12/242,278, filed Sep. 30, 2008 (35 pages).
Office Action mailed Sep. 2, 2010 for U.S. Appl. No. 12/242,168 (6 pages).
Office Action mailed May 7, 2012 for U.S. Appl. No. 12/242,158 (57 pages).
Final Office Action mailed Oct. 13, 2010 for U.S. Appl. No. 12/347,495 (22 pages).
Office Action mailed Mar. 22, 2011 for U.S. Appl. No. 12/347,495 (18 pages).

\* cited by examiner

METHODS AND APPARATUS FOR PRODUCING A HASH VALUE BASED ON A HASH FUNCTION

BACKGROUND

Embodiments described herein relate generally to hash functions, and, in particular, to a hash function configured to define a hash value based on predefined vectors.

A hash function is a procedure or mathematical function configured to calculate a hash value based on a hash key. In some instances, the hash key can be defined based on a portion of data parsed from input data. The hash value that can be used to retrieve information in a table/database or to compare data (e.g., input data). For example, a hash function can be used to detect duplicate records in a file, to find similar or matching deoxyribonucleic acid (DNA) sequences, to identify policies associated with Internet Protocol (IP) address prefixes, and so forth.

Many known hash functions, however, produce an unacceptable level of duplicate hash values (referred to as collisions) based on unique input data. In addition, many known hash functions produce unacceptably non-uniform distributions of hash values based on an input data set. Finally, many known hash functions that are simple to execute in software are too slow and/or cannot be efficiently implemented in hardware. Thus, a need exists for methods and apparatus to address at least some of the undesirable attributes of known hash functions.

SUMMARY OF THE INVENTION

In one embodiment, a method includes receiving a bit value from a key vector. The bit value has a position within the key vector correlating to a counter value. The method includes receiving a sequence of bit values from a plurality of predefined bit values based on the counter value and in response to a condition associated with the bit value from the key vector being satisfied.

DETAILED DESCRIPTION

A hash function module can be configured to define a hash value based on a key vector (also can be referred to as a hash key vector). The hash value can be used to retrieve data (also can be referred to as output data) from a hash database stored in a memory. The hash value can be defined by the hash function module based on a subset of predefined vectors (also can be referred to as predefined bit vectors) selected from a set of predefined vectors and based on a series of bitwise operations related to the subset of predefined vectors. The subset of predefined vectors can be selected from the set of predefined vectors based on a sequence of bit values (e.g., binary bit values) defining the key vector. For example, a predefined vector can be selected from a set of predefined vectors when a condition associated with a bit value (or combination of bit values) from the key vector is satisfied. In some embodiments, the key vector can have a sequence of bit values defined by a key vector module based on a portion of data (also can be referred to as input data) received at the key vector module. In some embodiments, the hash value can be referred to as an index value, a hash code, a hash sum, and so forth.

In some embodiments, each predefined vector from the set of predefined vectors can have one or more randomly defined bit values. In some embodiments, the predefined vectors can be received from a hash matrix associated with (e.g., stored at) the hash function module. In some embodiments, bit values within the hash matrix can be defined based on one or more conditions so that the bit values within the hash matrix collectively have a specified characteristic. The predefined vectors (and/or a hash matrix from which a set of bit values defining a predefined vector is selected) are referred to as predefined because each of the vectors is defined before one or more key vectors is used by the hash function module to define a hash value. For example, each of the predefined vectors is defined and uploaded to a memory where they can be accessed rather than defined dynamically as the key vector is being used to define a hash value.

In some embodiments, the hash function module can be included in a multi-stage switch and can be configured to retrieve a policy vector from a hash database based on a key vector. The key vector can be defined based on at least a portion of a data packet (e.g., an Internet Protocol (IP) packet) received at the multi-stage switch. The multi-stage switch can include a switch fabric that has multiple stages. In some embodiments, the policy vector retrieved from the hash database can be configured to trigger the multi-stage switch to process the data packet. Specifically, the policy vector can include one or more bit values that represent whether or not a policy condition (e.g., a match condition, a filter condition) associated with a policy has been satisfied. The policy vector can be used to trigger processing of the data packet at the multi-stage switch based on an instruction associated with the policy (when the bit value(s) indicate that the policy condition has been satisfied). The policy can be, for example, a policy to route a data packet to a particular destination (instruction) if the data packet has a specified type of network address (policy condition). In some embodiments, the hash function module can be implemented in hardware, or hardware and software. In some embodiments, the policy vector can be referred to as a facet cover vector.

Figure 1:
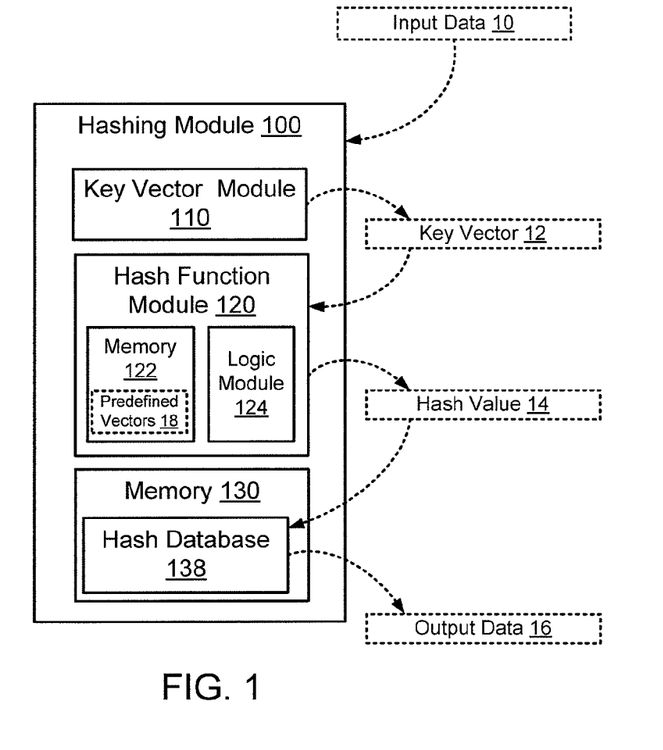
FIG. 1 is a schematic block diagram that illustrates a hashing module, according to an embodiment.

FIG. 1 is a schematic block diagram that illustrates a hashing module 100, according to an embodiment. Specifically, the hashing module 100 has a key vector module 110, a hash function module 120, and a memory 130 configured to store a hash database 138. The key vector module 110 is configured to produce a key vector 12 based on input data 10 received at the hashing module 100. In some embodiments, the input data 10 can be associated with a data packet (e.g., an IP packet) and/or a flow of data packets. The hash function module 120 is configured to define (e.g., produce) a hash value 14 based on the key vector 12. The hash value 14 can be used by the hashing module 100 to retrieve output data 16 from the hash database 138. In some embodiments, the hash value 14 can be a hash address value or an index value used to retrieve the output data 16 from a specified memory location within the memory 130.

As shown in FIG. 1, the hash function module 120, which is configured to define the hash value 14 based on the key vector 12, includes a memory 122 and a logic module 124. The hash function module 120 is configured to define the hash value 14 based on a one or more predefined vectors 18 stored in the memory 122. Specifically, one or more of the predefined vectors 18 can be processed at the logic module 124 (e.g., serially combined in bitwise combinations at the logic module 124) to define the hash value 14. One or more of the predefined vectors 18 can be selected by the logic module 124 based on one or more portions of the key vector 12. In some embodiments, a subset of the predefined vectors 18 can be selected based on a sequence of bit values defining the key vector 12. For example, a predefined vector can be selected from the predefined vectors 18 when a condition associated with a bit value (or combination of bit values) from the key vector 12 is satisfied.

In some embodiments, the predefined vectors 18 can have one or more randomly defined bit values and can be a subset of predefined vectors selected from a set of predefined vectors (not shown). In some embodiments, the predefined vectors 18 can be from or can define a hash matrix associated with the hash function module 120. In some embodiments, bit values within the hash matrix can be defined based on one or more conditions so that one or more rows and/or one or more columns of the hash matrix can have a specified characteristic.

The key vector 12 can be a binary string defined by, for example, a sequence of high values (represented as 1's) and/or low values (represented as 0's). The values in the binary string can be referred to as bit values. In other words, the key vector 12 can define a sequence of bit values. In some embodiments, if the hashing module 100 is implemented in a hardware system that is a base-n system (e.g., a base-4 system), the key vector 12 can be a base-n string. In some embodiments, the key vector 12 can be defined as a one-dimensional array. In some embodiments, if the hashing module 100 is implemented in software executing on a processor, the key vector 12 can be a string that includes a sequence of symbols (e.g., American Standard Code for Information Interchange (ASCII) characters) and/or digits. For example, the key vector 12 can be a byte string or a hexadecimal value.

The key vector module 110 can be configured to extract bit values associated with certain portions of the input data 10 to define the key vector 12. In other words, the key vector module 110 can be configured to parse a portion of the input data 10 received at the hashing module 100 and can use that portion to produce the key vector 12. In some embodiments, the key vector 12 can be defined based on portions of the input data 10 that have been modified (e.g., modified at the key vector module 110) or are unmodified.

In some embodiments, the key vector module 110 can be configured to define and include additional bit values (or strings) in the key vector 12. In some embodiments, the additional bit values can be default bit values and/or padding (e.g., zero padding). In some embodiments, for example, the key vector 12 can be defined based on additional bit values appended to, intermingled with, and/or logically combined with a portion of the input data 10. In some embodiments, the key vector 12 can have a specified quantity of bit values, such as, for example, a 1 bit width, a 72 bit width, or a 400 bit width. An example of a key vector defined based on a data packet is described in connection with FIG. 2.

Figure 2:
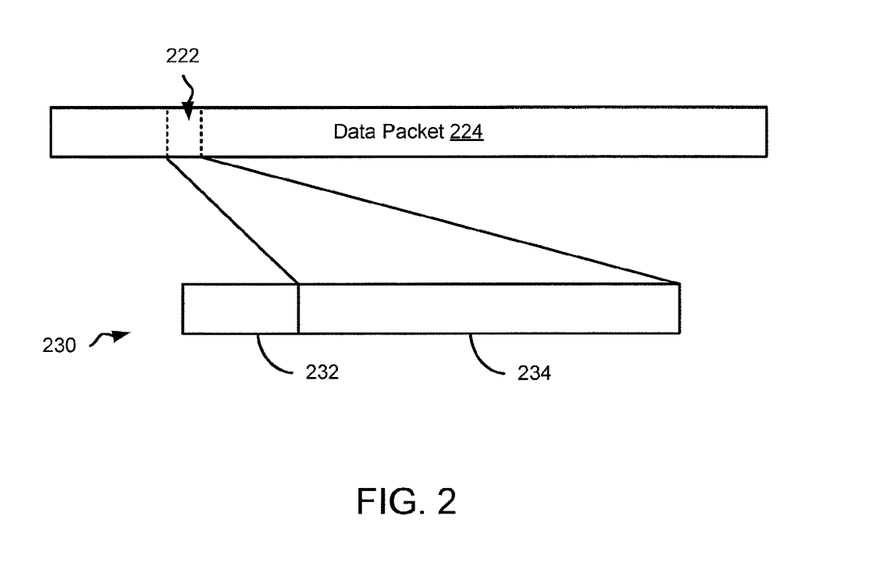
FIG. 2 is a schematic diagram that illustrates a key vector defined based on a portion of a data packet, according to an embodiment.

FIG. 2 is a schematic diagram that illustrates a key vector 230 defined based on a portion 222 of a data packet 224, according to an embodiment. The portion 222 can be, for example, a field (or a portion of a field) from a header, a payload, and/or a trailer of the data packet 224. In some embodiments, the portion 222 can be referred to as a facet. In some embodiments, the portion 222 can be associated with any of an address value (e.g., a destination address value, a source address value), a port value (e.g., a source port value, a destination port value), a protocol indicator, a type value, and so forth. In some embodiments, the bit values of the portion 222 of the data packet 224 can be modified before being included in the key vector 230.

As shown in FIG. 2, the key vector 230 includes a bit string 232 defined based on the data packet 224. In some embodiments, the bit string 232 can be a metadata tag that represents a characteristic of the key vector 230 (e.g., a length of the key vector 230) and/or a characteristic of the data packet 224 (e.g., a protocol type).

Referring back to FIG. 1, hash value 14 can be a binary string that represents a location (also can be referred to as a memory location) within the memory 130 configured to store the hash database 138. In some embodiments, the hash value 14 can be an index value that can be used to retrieve the output data 16 (or a portion of the output data 16) in the hash database 138. In some embodiments, the hash value 14 can have a bitwise width correlated with a number of memory locations (e.g., a number of mutually exclusive memory locations) associated with the memory 130 so that the hash value 14 (e.g., the bit values within the hash value 14) can be defined and used to precisely access each of the memory locations. If the hashing module 100 is implemented in software executing on a processor, the hash value 14 can be a string that includes a sequence of symbols and/or digits.

The memory 130 can be any type of memory such as a read-only memory (ROM) or a random-access memory (RAM) that can be used to store data such as data defining the hash database 138. In some embodiments, the hash database 138 can be a hash look-up table (also can be referred to as a hash table) or a hash array. In some embodiments, the hash database 138 can be a relational database.

The hashing module 100 can be a hardware-based module (e.g., a processor, an application-specific integrated circuit (ASIC), a field programmable gate array (FPGA)). In other words, the hashing module 100 can be implemented entirely in hardware. In some embodiments, the hashing module 100 can be integrated on one or more semiconductor chips that can have one or more substrates. In some embodiments, one or more portions of the hashing module 100 can be implemented in software (e.g., a set of instructions executable at a processor, a software application). In some embodiments, one or more portions (e.g., operations, functions) of the hashing module 100 can implemented in a combination of hardware and software.

In some embodiments, each input value can be referred to as an operand and each output value can be referred to as a result. For example, the key vector 12, which is used by the hash function module 120 to produce the hash value 14, can be referred to as an operand (or input value) received by the hash function module 120, and the hash value 14 can be referred to as a result (or output value) produced by the hash function module 120.

Figure 3:
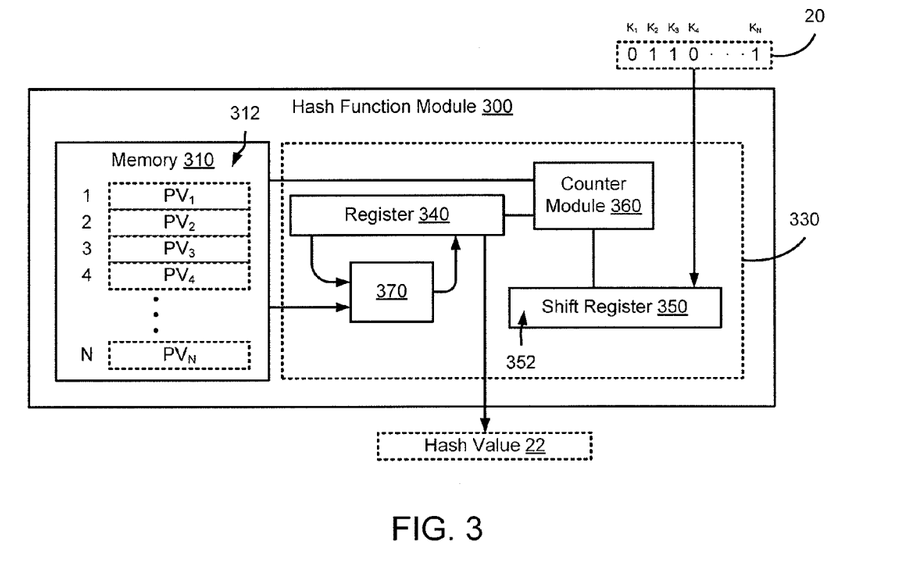
FIG. 3 is a schematic block diagram that illustrates a hash function module configured to define a hash value based on a key vector, according to an embodiment.

FIG. 3 is a schematic block diagram that illustrates a hash function module 300 configured to define a hash value 22 based on a key vector 20, according to an embodiment. The hash function module 300 includes a logic module 330 and a memory 310 configured to store predefined vectors 312 (also can be referred to as a set of predefined vectors). The logic module 330 is configured to receive the key vector 20, which has bit values $K_1$ through $K_N$ (bit values at locations 1 through N within the bit value sequence). As shown in FIG. 3, the key vector 20 has at least three bit values that are set (e.g., bit values that are a binary value of 1)—bit value $K_2$, bit value $K_3$, and bit value $K_N$. In some embodiments, a bit value can be set when the bit value is equal to zero (or a low bit value). As shown in FIG. 3, the predefined vectors 312 include predefined vectors $PV_1$ through $PV_N$, which are stored at memory locations 1 through N within the memory 310. In other words, the memory locations are associated with memory location values 1 through N (also can be referred to as memory address values or memory index values).

In this embodiment, the hash value 22 is defined based on a logical combination (e.g., a series of logical bitwise combinations) of predefined vectors selected from predefined vectors 312, which in turn are selected based on bit values that are set within the key vector 20. At least predefined vector $PV_2$, predefined vector $PV_3$, and predefined vector $PV_N$ are logically combined at the logic module 330 because bit values $K_2$, $K_3$, and $K_N$ are set. In some embodiments, predefined vectors that are selected from the predefined vectors 312 based on bit values within the key vector 20 can be referred to as a subset of predefined vectors (or as a subset of the predefined vectors 312).

The logic module 330 shown in FIG. 3 includes elements that can be used to select predefined vectors from the predefined vectors 312 based on the hash key 20; these elements can also be used to perform logical operations on the selected predefined vectors to produce the hash value 22. Specifically, the logic module 330 includes a register 340, a shift register 350, a counter module 360, and a combination module 370. When the logic module 330 is initialized, all of the bit values within the register 340 are set to zero, the key vector 20 is received at the shift register 350, and a counter value defined by the counter module 330 is set to an initial value of 1. In some embodiments, the register 340 can be initialized with a sequence of bit values different than a string of zeros and the counter value can be initialized with a different initial value than 1. In some embodiments, the logic module 330 can be initialized in response to a key vector 20 being received at the hash function module 300. In some embodiments, the logic module 330 can be initialized based on a specified number of clock cycles produced by a clock generator (not shown) associated with the hash function module 300.

During calculation of the hash value 22, the counter value is incremented (e.g., increased, decreased) by the counter 360 when the key vector 20 is shifted to the left within the shift register 350. When the most significant bit value (the left most bit value at location 352) within the shift register 350 is set (e.g., a high value), a predefined vector from the predefined vectors 312 is selected and combined in an exclusive-or (XOR) operation of the combination module 370 with the bit values (e.g., the initialized bit values) already included in the register 340. The resulting bit values from the combination module 370 are stored in the register 340 (e.g., written over the bit values in the register 340). The predefined vector is selected based on a memory location value defined based on the counter value (e.g., the current counter value) of the counter module 360. In this embodiment, the predefined vector is selected from the predefined vectors 312 based on a memory location value that corresponds with the counter value defined by the counter module 360. When a threshold condition is satisfied based on the counter value of the counter module 360 (e.g., when the counter value is equal to or greater than a threshold value), at least a portion of the bit values in the register 340 are used as the hash value 22.

In this embodiment, the counter module 360 is configured to incrementally increase the counter value from 1 to N, which corresponds with the memory location values 1 through N of the memory 310. Accordingly, the hash value 20 within the shift register 350 is shifted to the left 1 through N times so that each of the bit values (bit values $K_1$ through $K_N$) of the hash value 20 are shifted through the most significant bit location 352 of the shift register 350. Thus, each of the bit values of the hash value 20 can trigger (if set) a predefined vector to be selected from the predefined vectors 312. As illustrated by this example, the counter value, the memory location value, and the locations of the bit values within the key vector 20 are correlated.

For example, when bit value $K_1$ from the key vector 20 is in the most significant bit location 352 of the shift register 350, a predefined vector is not selected from the predefined vectors 312 because bit value $K_1$ from the key vector 20 is not set. In other words, predefined vector $PV_1$, although eligible for selection based on its location within the memory 310, is not selected from the predefined vectors 312 and predefined vector $PV_1$ is not combined with the initial value in the register 340 via the combination module 370 because bit value $K_1$ from the key vector 20 is not set.

When bit value $K_2$ from the key vector 20 is shifted into the most significant bit location 352 of the shift register 350, the counter value maintained by counter module 360 is incremented from the initial value of 1 to the next counter value of 2. In this case, predefined vector $PV_2$ from the predefined vectors 312 is selected from memory location 2 within the memory 310 and the predefined vector $PV_2$ is combined with the initial value in the register 340 via the combination module 370 because bit value $K_2$ from the key vector 20 is set.

When bit value $K_N$ from the key vector 20 is shifted into the most significant bit location 352 of the shift register 350 the counter value maintained by counter module 360 is incremented to counter value N. In this case, because bit value $K_N$ from the key vector 20 is set, predefined vector $PV_N$ from the predefined vectors 312 is selected from memory location N and the predefined vector $PV_N$ (the last predefined vector in the memory 310) is combined with the bit sequence in the register 340 via the combination module 370. When the counter value is N, the bit sequence in the register 340 can be used as the hash value 22.

In some embodiments, less than all of the bit values in the register 340 can be used to define the hash value 22. For example, a segment of the bit values from the register 340 (e.g., a truncated portion of the bit values from the register 340) and/or individual bit values from the register 340 can be used to define the hash value 22. In some embodiments, the bit values used to define the hash value 22 can be selected from the register 340 based on a different function implemented in a function module (not shown). Although not shown, in some embodiments, a combination (e.g., a logical bitwise combination) of one or more bit values within registers from multiple hash function modules can be used to define a hash value.

In this embodiment, each predefined vector that is selected from the predefined vectors 312 is combined in a serial fashion with the bit values in the register 340. Moreover, each of the predefined vectors selected from the predefined vectors 312 are combined with the bit values in the register 340 in the order that they appear in the memory 310. In some embodiments, the predefined vectors 312 that are retrieved from the memory 310 based on the hash key value 20 can be combined in any order. For example, in some embodiments, pairs of predefined vectors retrieved from the memory 310 (e.g., predefined vector $PV_2$ and predefined vector $PV_3$) can be combined using a logical bitwise operation, and the result can be combined with the bit values in the register 340.

In some embodiments, the predefined vectors selected from the predefined vectors 312 can be combined using a different logical operation than the exclusive-or operation implemented by the combination module 370. For example, the predefined vectors 312 can be combined using any combination of a "nor" operation, an "and" operation, a "nand" operation, and so forth. In some embodiments, the predefined vectors selected from the predefined vectors 312 can be combined based on a function (e.g., an algorithmic function).

In this embodiment, because the key vector 20 has N bit values and N predefined vectors are stored in the memory 310, each bit value from the key vector 20 can be used to trigger selection of a predefined vector 312 from a different memory location (which can each include a unique predefined vector bit value sequence). In some embodiments, one or more of the predefined vectors 312 can be made eligible for selection from the memory 310 in connection with more than one bit value from the key vector 20. For example, in some embodiments, a predefined vector such as predefined vector $PV_2$ can be used more than once to define hash value 22 in response to more than one bit value from the key vector 20 being set.

In some embodiments, one or more of the predefined vectors 312 can be ineligible for selection (e.g., can be prevented from being selected) from the memory 310 when calculating the hash value 22. For example, in some embodiments, $PV_4$ may be made ineligible (e.g., skipped) for selection from the memory 310 when calculating hash value 22. In some embodiments, the logic module 330 can be configured to skip specified memory locations from the memory 310 when calculating the hash value 22 based on the key vector 20 (and/or based on input data used to define the key vector 20).

In some embodiments, the number of bit values included in the key vector 20 and the number of predefined vectors stored in the memory 310 can be different. In such embodiments, the counter value range associated with the counter module 360 can be modified accordingly. For example, the number of predefined vectors 312 stored in the memory 310 can be less than the number of bit values included in the key vector 20. In such embodiments, one or more of the predefined vectors 312 can be selected more than once based on the bit values included in the key vector 20. In some embodiments, the number of predefined vectors 312 stored in the memory 310 can be greater than the number of bit values included in the key vector 20. Accordingly, a subset of memory locations, in which some of the predefined vectors 312 are stored, can be made eligible for selection when defining the hash value 22. The subset of memory locations can be defined based on, for example, the key vector 20 and/or based on input data used to define the key vector 20. In some embodiments, the memory 310 can be configured to include a number of predefined vectors 312 sufficient to accommodate key vectors (not shown) having variable bitwise widths.

In some embodiments, combinations of bit values (rather than individual bit values) included in the key vector 20 can be used to select a predefined vector from the predefined vectors 312. The combination of bit values can be a group of bit values having a specified sequence. For example, in some embodiments, predefined vector $PV_2$ can be selected from the predefined vectors 312 and used to define the hash value 22 in response to bit values $K_3$ and $K_4$ having the pattern "10." In some embodiments, the number of predefined vectors included in the memory 310 can be decreased when multiple bit values from the key vector 20 are used to select predefined vectors 312 from the memory 310. For example, each mutually exclusive pair of bit values from the key vector 20 can be associated with a mutually exclusive memory location for a total of N/2 memory locations. Each of the memory locations can be configured to store one of the predefined vectors 312.

In some embodiments, each of the predefined vectors 312 can have a bitwise width that is the same as a bitwise width of the hash value 22. In some embodiments, one or more of the predefined vectors 312 can have a bitwise width that is different than that of the hash value 22. For example, in some embodiments, all of the predefined vectors 312 can have a bitwise width that is greater than that of the hash value 22. Accordingly, the quantity of bit values in the register 340 can be greater than the quantity of the bit values included in the hash value 22. The bit values in the hash value 22 can be selected from a subset of the bit values included in the register 340. In some embodiments, if the quantity of bit values included in the register 340 is less than the quantity of bit values needed to define the hash value 22 (because one or more of the predefined vectors 312 has a width that is less than the width of the hash value 22), additional bit values can be defined and appended to the hash value 22.

In some embodiments, one or more of the predefined vectors 312 can be defined so that they have a specified number of 1's and/or 0's. In some embodiments, for example, one or more of the predefined vectors 312 can be defined so that they have more (or less) than a specified number of 1's or more (or less) than a specified number of 0's. In some embodiments, one or more of the predefined vectors 312 can be defined so that they have an equal number of 1's and 0's.

In some embodiments, the predefined vectors 312 can be defined so that each bit value in the register 340 has a specified probability (e.g., at least a 50% chance) of changing when selected. This type of condition can be referred to as an avalanche condition. For example, each of the predefined vectors 312 can have an equal number of randomly defined 1's and 0's so that when a predefined vector (such as predefined vector $PV_3$) is combined with the bit values in the register 340, the bit values in the register 340 have a 50% probability of being modified.

In some embodiments, key vector 20 can be received in a register (not shown) rather than shift register 350. The logic module 330 can have a logic component (not shown) configured to access each bit value from the key vector 20 to determine whether or not a predefined vector from the predefined vectors 312 should be selected. The logic component can be configured to access each bit value from the key vector 20 based on the counter value of the counter module 360.

In some embodiments, the predefined vectors 312 can be used to calculate multiple hash values (not shown) in addition to hash value 22 based on multiple key vectors (not shown) in addition to key vector 20. In some embodiments, the predefined vectors 312 can be stored as a matrix of bit values that can be referred to as a hash matrix. More details related to predefined vectors and hash matrices are discussed in connection with FIG. 4. In some embodiments, a library of predefined vector sets (not shown) can be stored in a memory of a hash function module and selected, based on one or more key vectors, for use by a logic module to define one or more hash values.

Although not shown, in some embodiments, the vectors used by the logic module 330 to define the hash value 22, rather than being predefined vectors, can be defined dynamically. For example, the vectors can be defined in response to the hash key value 20 being received. In some embodiments, for example, each of the vectors can be defined dynamically when each of the vectors is used by the combination module 370. The bit values within the vectors can be defined based on a specified seed value (or set of seed values) and/or based on a pseudo-random number generator. The seed value(s) can be defined in a specified sequence and/or based on one or more conditions so that the seed value(s) and/or resulting vector(s) have a specified characteristic(s).

Figure 4:
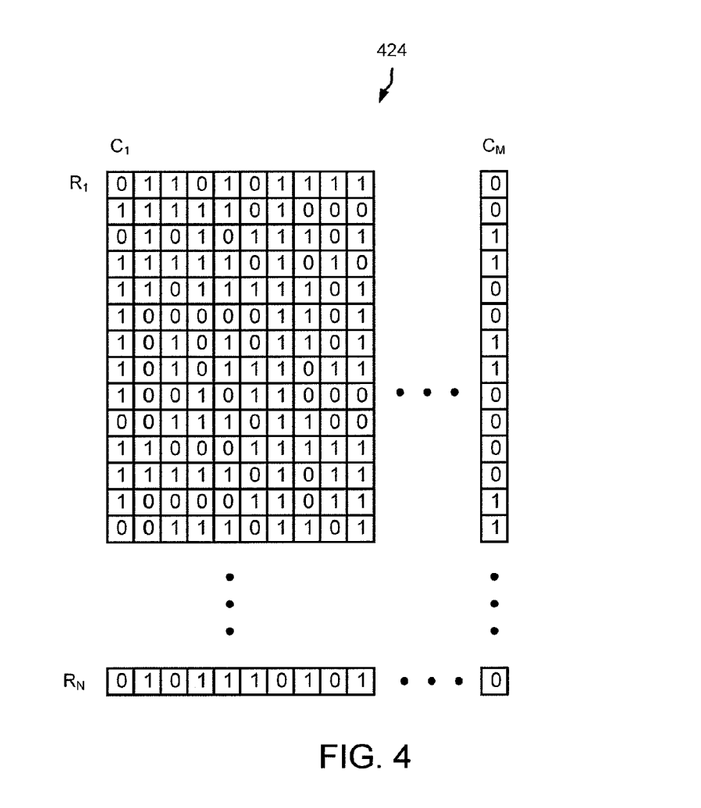
FIG. 4 is a schematic diagram that illustrates a hash matrix, according to an embodiment.

FIG. 4 is a schematic diagram that illustrates a hash matrix 424, according to an embodiment. Although not shown, the hash matrix 424 can be stored in a memory and can be accessed by a logic module within a hash function module. A hash value can be calculated using one or more predefined vectors, which are each defined based on the bit values within the hash matrix 424. For example, each row (or portion of a row) and/or each column (or portion of a column) within the hash matrix 424 can correspond with a predefined vector.

Each bit value from the hash matrix 424 can be randomly defined based on a pseudo-random number generator and/or based on physical phenomenon, such as white noise, radioactive decay, and so forth. In some embodiments, only some of the bit values from the hash matrix 424 are randomly defined. In some embodiments, the bit values of the hash matrix 424 can be loaded within a memory of a hash function module after the bit values of the hash matrix 424 have been defined.

As shown in FIG. 4, the hash matrix 424 has columns $C_1$ through $C_M$ and rows $R_1$ through $R_N$. The hash matrix 424 can be defined so that sequence of bit values within each row and/or each column from the hash matrix 424 is unique. In some embodiments, the hash matrix 424 can be defined so that at least a certain portion of a specified number of rows and/or column have unique sequences of bit values. In some embodiments, if each the rows and/or columns is not unique within the hash matrix 424, the rows and/or column can be defined so that each row and/or column has less than a specified number of matches (e.g., less than three) within the hash matrix 424. The matching rows and/or matching columns can be a specified number of rows and/or a specified number of columns apart.

In some embodiments, the rows and/or column of the hash matrix 424 can be defined so that each row and/or each column has a specified number of 1's and/or a specified number of 0's. This type of condition can be referred to as a dependency condition (e.g., a reverse dependency condition, a forward dependency condition). In some embodiments, the rows of the hash matrix 424 can be defined so that each column has a specified number of 1's and/or a specified number of 0's, and vice versa. For example, each of the rows can be defined so that at least half of the bit values, exactly half of the bit values, or less then half of the bit values within each of the columns are zeros. In some embodiments, the hash matrix 424 can be a finite field matrix. For example, the hash matrix 424 can be a Galois Field (GF) matrix (e.g., a GF(2) matrix).

In some embodiments, a hash function module can be implemented in hardware and/or software executing on a processor. In some embodiments, a hash function module can produce a hash value based on a hash matrix and a key vector.

For example, a hash matrix can include a group of hash vectors as rows in the hash matrix. The elements of the hash vectors with similar indexes can define the columns of the hash matrix. In some embodiments, there are as many hash vectors in the hash matrix as bits in a bit vector representation of a key vector. In other words, the number of hash vectors in the hash matrix can be equal to the bit width of the key vector. In some embodiments, a hash value can be produced based on an iterative and/or a selective combination of hash vectors from the hash matrix. More specifically, for example, for each hash vector in a hash matrix, if the least significant bit in a key vector has a bit value of 1, the hash value can be assigned the value of an XOR combination of the hash value and a hash vector from the hash matrix. The key vector can then be shifted or rotated one (or more) bit(s) to the right, and the process repeated for the next hash vector in the hash matrix. After the process has been completed for each hash vector in the hash matrix, the final hash value can be used, for example, as an index into a hash table.

In some embodiments, the hash value can be assigned the value of an XOR combination of the hash value and a hash vector from the hash matrix if the most significant bit in the hash vector has a bit value of 1 and the key vector is shifted or rotated one bit to the left. In some embodiments, the hash value can be assigned the value of an XOR combination of the hash value and a hash vector from the hash matrix if a currently indexed element of the key vector has a bit value of 1 and the index is incremented such that each element of the key vector is the basis for assigning a value to the hash value.

In some embodiments, a hash matrix can be produced by a hardware module or a processor executing software configured to repeatedly produce random hash vectors until a specified (e.g., a sufficient) number of hash vectors have been produced to form the hash matrix. In some embodiments, a hash vector can be discarded if it does not have a number of 1's that is within a specified range (as defined in a dependency condition). For example, in some embodiments, each hash vector (or row) in the hash matrix that has a number of 1's in a range from half the number of elements in the hash vector to two more than half the number of elements in the hash vector. In other embodiments, other ranges can be specified. In some embodiments, a hardware module or processor can be configured to verify that a hash module has the specified number of 1's before adding the vector to the matrix. In some embodiments, the hardware module or processor can verify that a hash module has the specified number of 1's after the hash vector has been added to the hash matrix, and remove the hash vector from the hash matrix if the hash vector does not have an appropriate number of 1's.

In some embodiments, each hash vector in a hash matrix can be distinct from the remaining hash vectors in the hash matrix. For example, a hardware module or processor can determine before adding a hash vector to a hash matrix whether the hash vector is already included in the hash matrix and discard the randomly determined hash vector if that hash vector (i.e., a hash vector with elements of identical values) is already included in the hash matrix. In some embodiments, this can be referred to as a uniqueness condition.

In some embodiments, the columns of the hash matrix can be defined so that each has a specified number of 1's (as defined in a dependency condition). For example, a hardware module or processor executing software can define an array of elements including an element representing a count (or number) of 1's in each column of the matrix. The hardware module or processor can iteratively process each hash vector (or row) in the hash matrix to count the number of 1's in each column by incrementing an index in the array and incrementing the value of the element at the current index of the array if the value of the hash vector at the current index is 1. The index value can be reset at the end of each hash vector and the next hash vector in the hash matrix processed until all the hash vectors in the hash matrix have been processed and the array includes a count of 1's for each column in the hash matrix.

In some embodiments, a hardware module or a processor executing software can be configured to repeatedly produce hash matrixes until a hash matrix that has columns with at least a number of 1's greater than a number specified in a dependency condition is defined. In some embodiments, the columns of the hash matrix can be defined based on a dependency condition before it is determined whether or not the rows of the hash matrix (which can be iteratively defined) satisfy a dependency condition. In some embodiments, the iterative loop can be executed multiple times to produce multiple hash matrices.

Figure 5:
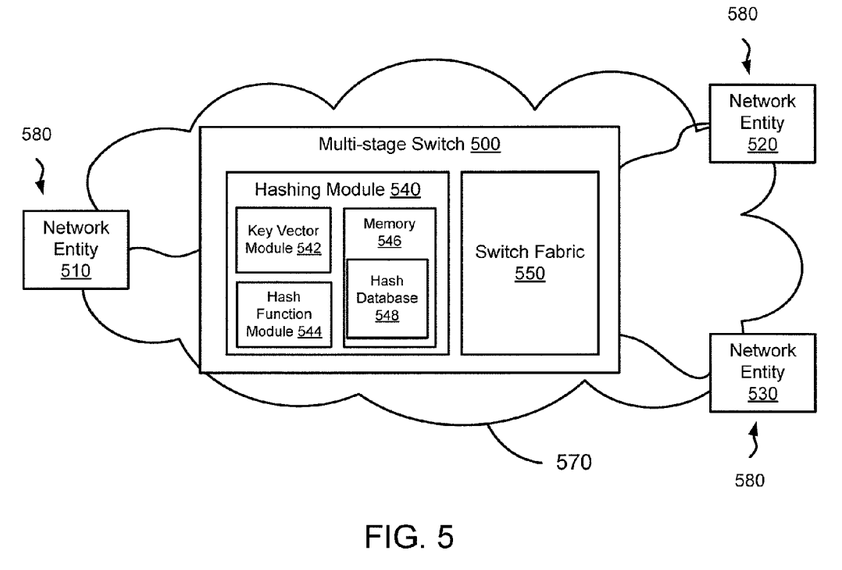
FIG. 5 is a flowchart that illustrates a method for defining a hash value based on a data packet received at a multi-stage switch, according to an embodiment.

FIG. 5 is a schematic block diagram that illustrates a multi-stage switch 500 that includes a hashing module 540, according to an embodiment. The hashing module 540 includes a key vector module 542, a hash function module 544, and a memory 546 configured to store a hash database 548. The multi-stage switch 500 includes a switch fabric 550 through which data received from the network entities 580 can be routed. The switch fabric 550 can include one or more stages (e.g., an ingress stage, an egress stage, a middle stage) and can be defined based on a Clos network architecture (e.g., a strict sense non-blocking Clos network, a Benes network). In some embodiments, a network architecture such as, for example, a Clos network and/or a Benes network can be reconfigurable (e.g., rearrangeable). In some embodiments, the switch fabric 550 can be a reconfigurable switch fabric and/or a time-division multiplexed switch fabric.

The multi-stage switch 500 can be configured to send data to and/or receive data from any of the network entities 580 via a network 570. The network entities 580 include network entity 510, network entity 520, and network entity 530. The data can be, for example, a data packet such as an Internet Protocol packet and/or a flow of data packets.

The multi-stage switch 500 can be configured to process the data at the multi-stage switch 500 based on information retrieved from the hash database 548. For example, the hash database 548 can include one or more policy vectors that can be retrieved based on data received at the multi-stage switch 500. Specifically, the hashing module 540 can be configured to define a hash value at the hash function module 544 based on a key vector defined at the key vector module 542. The key vector can be defined based on at least a portion of the data. The policy vector can be retrieved from a location within the memory 546 based on the hash value.

The policy vector can be configured to trigger processing associated with the data received at the multi-stage switch 500. For example, the policy vector can be configured to trigger routing of the data packet through the switch fabric 550 in a specific fashion and/or trigger forwarding of the data packet to network entity 520. In some embodiments, the hashing module 540 can be included in a packet classification module (not shown). In some embodiments, the policy vector can be sent from the hashing module 540 to a packet processing module (not shown) that can be configured to trigger and/or execute processing in response to the policy vector. More details related to policy vectors and processing triggered by policy vectors are discussed below in connection with FIGS. 7, 8, and 9.

In some embodiments, each of the network entities 580 can be a wired device and/or a wireless device and can be, for example, a computing entity (e.g., a personal computing device), a mobile phone, a personal digital assistant (PDA), and/or a server (e.g., a web server/host). In some embodiments, each of the network entities 580 can function as a source device and/or as a destination device. Each of the network entities 580 can be configured to operate based on one or more platforms that can include on one or more types of hardware, software, operating systems, runtime libraries, and so forth. The network 570 can be, for example, a virtual network, a local area network (LAN) and/or a wide area network (WAN). In some embodiments, the network 570 can include one or more wired and/or wireless segments.

More details related to processing of a data at a multi-stage switch using one or more hashing module are set forth in co-pending patent application Ser. No. 12/242,168, filed Sep. 30, 2008, entitled "Methods and Apparatus for Packet Classification associated with a Multi-Stage Switch"; co-pending patent application bearing Ser. No. 12/242,154, filed Sep. 30, 2008, entitled "Methods and Apparatus Related to Packet Classification Based on Range Values"; and co-pending patent application bearing Ser. No. 12/242,172, filed Sep. 30, 2008, entitled "Methods and Apparatus for Packet Classification based on Policy Vectors," all of which are incorporated by reference herein in their entireties.

Figure 6:
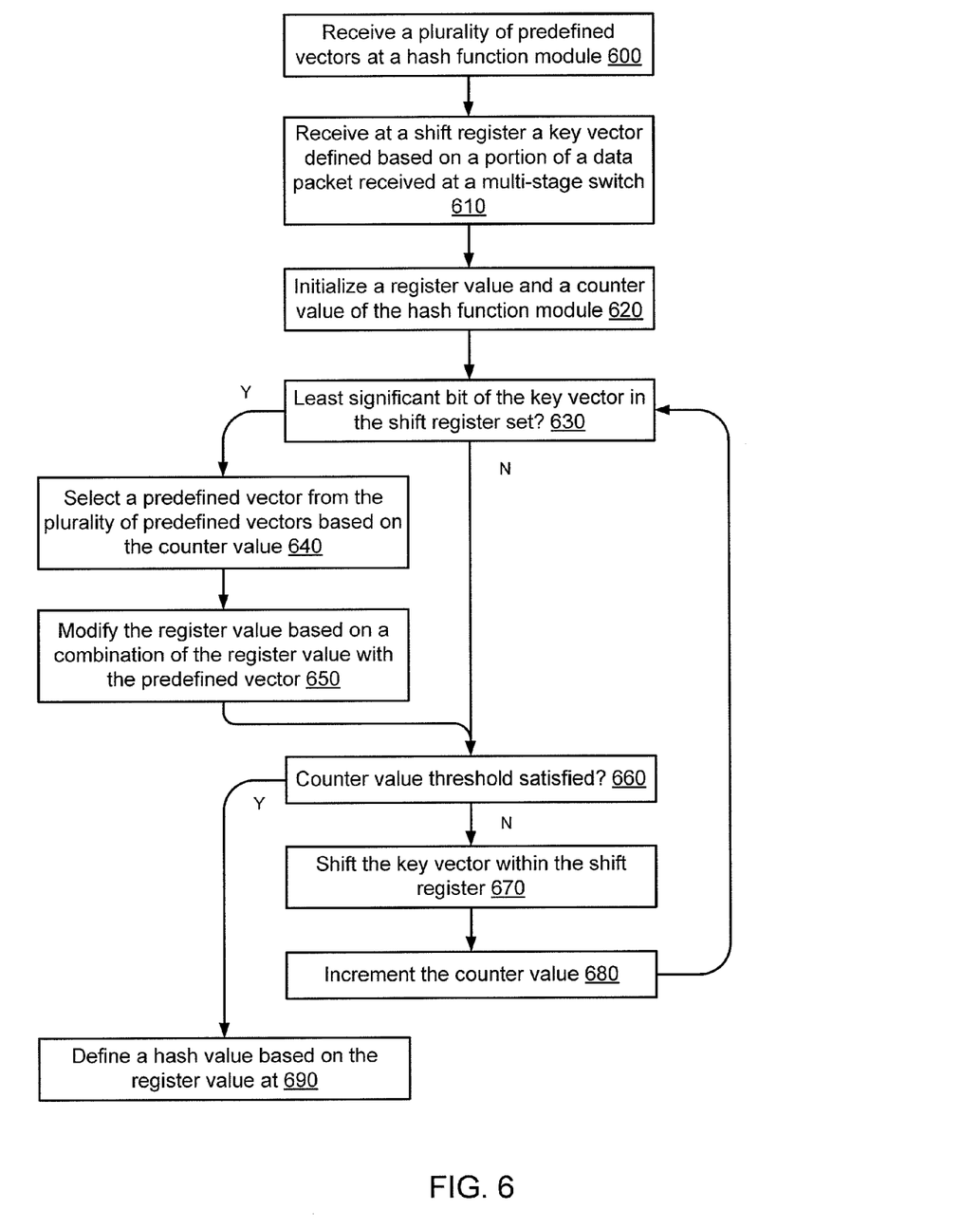
FIG. 6 is a schematic block diagram that illustrates a multi-stage switch that includes a hashing module, according to an embodiment.

FIG. 6 is a flowchart that illustrates a method for defining a hash value based on a data packet received at a multi-stage switch, according to an embodiment. A plurality of predefined vectors are received at a hash function module at 600. The plurality of predefined vectors can be stored in a memory associated with the hash function module. The bit values of the predefined vectors can be randomly defined bit values. In some embodiments, the predefined vectors can be included in a hash matrix defined based on one or more conditions.

A key vector defined based on a portion of a data packet is received at a shift register at 610. The data packet can be received at a multi-stage switch via, for example, a network.

A register value and a counter value of the hash function module are initialized at 620. In some embodiments, the register value can be initialized with a string of ones or a different binary string. In some embodiments, the counter value can be started at a first value within a range of values defined based on a quantity of bit values included in the key vector. In some embodiments, the initialization can be triggered in response to the key vector being received at the shift register.

A predefined vector from the plurality of predefined vectors is selected based on the counter value at 640 when a least significant bit value (right most bit value) of the key vector in the shift register is set as determined at 630. In some embodiments, the predefined vector can be selected from a memory location defined based on the counter value. The register value is modified based on a combination of the register value with the predefined vector at 650. In some embodiments, the register value can be modified based on exclusive-or operation.

The key vector is shifted within the shift register at 670 and the counter value is incremented 680 when a threshold condition is not satisfied based on the counter value at 660 (e.g., when the counter value is less than a threshold value). In this embodiment, the key vector is shifted to the right so that the least significant bit value within the shift register is changed. The counter value is tested against the threshold condition at 660 (without selecting a predefined vector at 640 and without modifying the register value at 650) when the least significant bit value of the key vector in the shift register is not set as determined at 630.

A hash value is defined based on the register value at 690 when the threshold condition is satisfied based on the counter value as determined at 660. In some embodiments, the hash value can be a copy of the bit values included in the register value. In some embodiments, the register value can be used in a function and/or combined with (e.g., appended to, logically combined with) another sequence of bit values to define the hash value.

Figure 7:
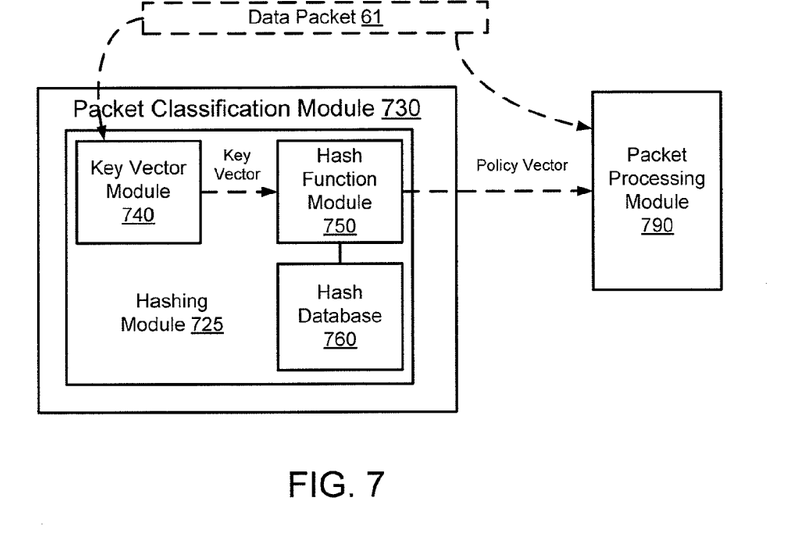
FIG. 7 is a schematic diagram that illustrates a hashing module included in a packet classification module according to an embodiment.

FIG. 7 is a schematic diagram that illustrates a hashing module 725 included in a packet classification module 730 according to an embodiment. The packet classification module can be configured to classify a data packet 61 (e.g., an Internet Protocol (IP) packet, a session control protocol packet, a media packet) so that the data packet 61 can be processed at a packet processing module 790 based on a policy. Classifying can include any processing performed so that the data packet 61 can be processed based on the policy. The policy can include an instruction that can be executed at the packet processing module 790.

The packet classification module 730 is configured to receive the data packet 61 and is configured to produce a policy vector that can be used by the packet processing module 790 to process the data packet 61 based on an instruction (or trigger execution of the instruction) associated with a policy. The hashing module 725 includes a key vector module 740 configured to produce a key vector that can be used by the hash function module 750 to retrieve the policy vector from a hash database 760. In some embodiments, the packet classification module 730 can be included in a multi-stage switch (not shown). In some embodiments, the instruction can be associated with routing of the data packet 61 through a switch fabric (not shown) of the multi-stage switch.

Although not shown, in some embodiments, a policy vector retrieved from a hash database can be a compressed policy vector. A decompressed policy vector can be defined at decompression module based on the compressed policy vector. The decompressed policy vector can include one or more bit values that represent whether or not a policy condition associated with a policy has been satisfied. The decompressed policy vector can be used to trigger processing of the data packet at the multi-stage switch based on an instruction associated with the policy (when the bit value(s) indicate that the policy condition has been satisfied). More details related to compressed policy vectors and decompressed policy vectors are set forth in a co-pending patent application bearing Ser. No. 12/242,143, filed Sep. 30, 2008, entitled, "Methods and Apparatus for Compression in Packet Classification," which is incorporated herein by reference in its entirety.

Figure 8:
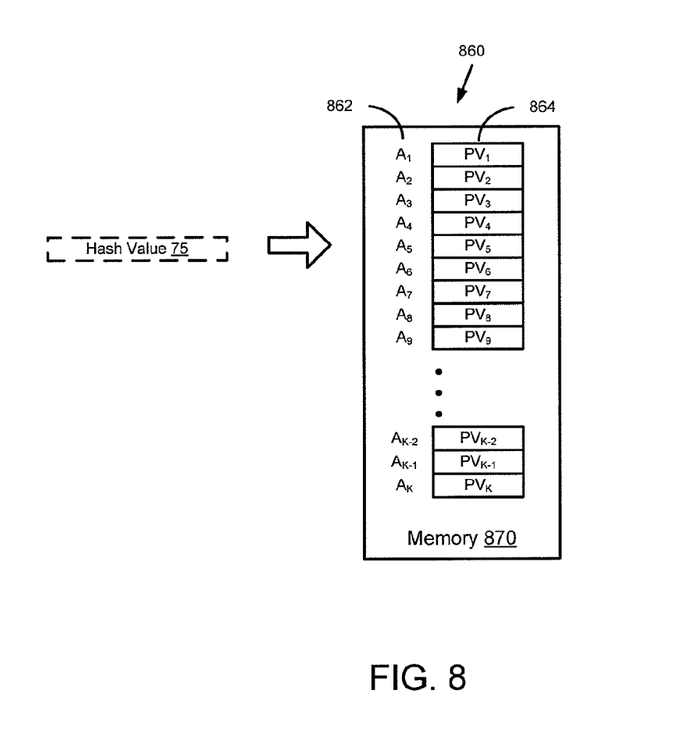
FIG. 8 is a schematic diagram that illustrates a hash database that includes policy vectors associated with a multi-stage switch, according to an embodiment.

FIG. 8 is a schematic diagram that illustrates a hash database 860 that includes policy vectors 864 associated with a multi-stage switch (not shown), according to an embodiment. The policy vector database 860 includes policy vectors $PV_1$ through $PV_K$ (shown in column 864). Each of the policy vectors 864 is stored at a location within a memory 870 represented by one of the address values $A_1$ through $A_K$. In some embodiments, the address values 862 can be referred to as memory address values. The hash value 75 can be used to locate at least one of the policy vectors 864 stored in the hash database 860 at a particular address value 862. In some embodiments, the hash value 75 can correspond with one of the address values 862. In some embodiments, the hash database 860 can include a logic module (not shown) that can use bit values that define the hash value 75 to retrieve a policy vector from the policy vector database 860. In other words, this logic module can translate the hash value 75 into an address value 862 of the memory 870.

In some embodiments, the memory 870 can be any type of memory such as a read-only memory (ROM) or a random-access memory (RAM). In some embodiments, the hash database 860 can be a look-up table (LUT) or a memory array. In some embodiments, the hash database 860 can be a relational database. In some embodiments, the policy vectors stored in the policy vector database 860 can be compressed policy vectors. Accordingly, the memory 870 can be relatively small and can be integrated with a hashing module (not shown) on a single semiconductor chip. In some embodiments, the compressed policy vectors can be compressed based on a pattern compression scheme and/or a run-length compression scheme.

Figure 9:
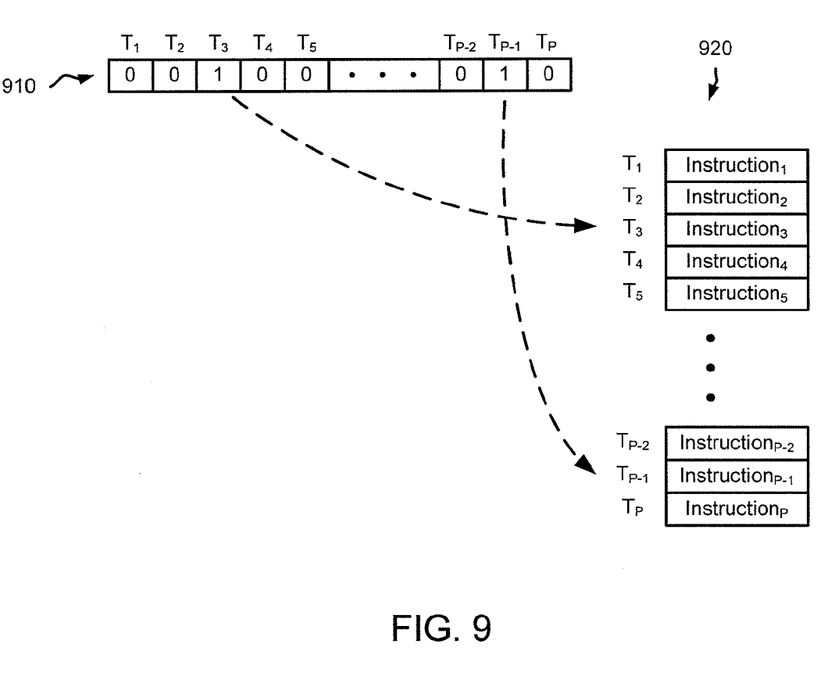
FIG. 9 is a schematic diagram that illustrates a policy vector configured to trigger processing at a multi-stage switch, according to an embodiment.

FIG. 9 is a schematic diagram that illustrates a policy vector 910 configured to trigger processing at a multi-stage switch (not shown), according to an embodiment. The policy vector 910 includes bit values $T_1$ through $T_P$, which can each be configured to trigger processing at the multi-stage switch. Specifically, each of the set bit values (e.g., bit values that have a high binary value) in the policy vector 910 represent whether or not a policy condition associated with a policy has been satisfied. The set bit values can be used to look-up at least one an instruction from instructions 1 through P (i.e., instruction$_1$ through instruction$_P$) in database 920. After an instruction has been identified, the instruction can be executed at the multi-stage switch. In some embodiments, the policy vector 910 can be configured to trigger processing associated with data packet 11 and/or can be configured to trigger processing of a data packet flow associated with data packet 11. In some embodiments, a bit value can be set when the bit value is low or zero.

As shown in the policy vector 910 in FIG. 9, bit value $T_3$, which is set, is associated with instruction$_3$, and bit value $T_{P-1}$, which is also set, is associated with instruction$_{P-1}$. Accordingly, bit value $T_3$ can be used to trigger execution of instruction$_3$ and bit value $T_{P-1}$ can be used to trigger execution of instruction$_{P-1}$. The instruction can be related to processing of a data packet at a multi-stage switch and can include, for example, logging information related to the data packet, verification of information at the multi-stage switch, forwarding of the data packet to a specific destination, dropping the data packet (or a related data packet), routing a portion of a data packet flow associated with the data packet through a portion of a multi-stage switch, and so forth.

In some embodiments, a combination of bit values (e.g., binary values of 1's and/or 0's) within the policy vector can represent whether or not a policy condition has been satisfied. If satisfied, one or more instructions associated with the policy condition can be retrieved and/or executed. In other words, a sequence of bit values including more than one bit value can represent that a policy condition associated with an instruction has been satisfied. Accordingly, the sequence of bit values within the policy vector can trigger execution of an instruction. In some embodiments, a single bit value within the policy vector can represent that a policy condition associated with more than one instruction has been satisfied. In some embodiments, the single bit value within the policy vector can be used to trigger execution of the instructions. In some embodiments, the policy vector 910 can be a policy vector defined after being decompressed at a multi-stage switch via a decompression module (not shown).

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and ROM devices and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a hash value can be calculated based on nested hashing modules where the hash value is produced by a hashing module based on a result from another hashing module.

What is claimed is:

1. A method, comprising:
    receiving a bit value from a key vector, the bit value having a position within the key vector correlating to a counter value; and
    receiving a sequence of predefined bit values from a plurality of predefined bit values based on the counter value corresponding to a memory location value associated with the sequence of predefined bit values and in response to a condition associated with the bit value from the key vector being satisfied.

2. The method of claim 1, wherein the key vector is defined based on a portion of a data packet received at a multi-stage switch,
    the method further comprising:
    defining a hash value based on the sequence of predefined bit values from the plurality of predefined bit values; and
    receiving a policy vector associated with the multi-stage switch based on the hash value.

3. The method of claim 1, wherein the sequence of predefined bit values is a first sequence of predefined bit values, the method further comprising:
    receiving a second sequence of predefined bit values from the plurality of predefined bit values; and
    defining a third sequence of bit values based on a bitwise operation on both the first sequence of predefined bit values and the second sequence of predefined bit values.

4. The method of claim 1, wherein the counter value is from a plurality of counter values, the plurality of counter values is defined based on a quantity of bit values included in the key vector.

5. The method of claim 1, further comprising:
    determining a location of the sequence of predefined bit values within the plurality of predefined bit values based on the counter value, the receiving the sequence of predefined bit values including receiving the sequence of predefined bit values from the location within the plurality of predefined bit values.

6. The method of claim 1, wherein the receiving the bit value from the key vector includes receiving the bit value from a specified location of a shift register where the key vector is defined.

7. The method of claim 1, wherein the key vector is defined by a shift register,
    the method further comprising:
    moving the bit value from a location within the shift register in response to the condition being unsatisfied.

8. The method of claim 1, wherein the plurality of predefined bit values define a hash matrix.

9. The method of claim 1, wherein the plurality of predefined bit values define a hash matrix having a bitwise length equal to a bitwise width of the key vector.

10. The method of claim 1, wherein the plurality of predefined bit values define a plurality of rows that each has a unique sequence of predefined bit values.

11. The method of claim 1, wherein the plurality of predefined bit values are defined based on a reverse dependency condition.

12. The method of claim 1, wherein each bit value from the plurality of predefined bit values is randomly defined.

13. An apparatus comprising:
    a memory configured to store a plurality of predefined bit vectors; and
    a logic module configured to receive a key vector defined based on a portion of a data packet received at a multi-stage switch, the logic module configured to select a first predefined bit vector from the plurality of predefined bit vectors stored at the memory based on a first bit value of the key vector, the logic module configured to select a second predefined bit vector from the plurality of predefined bit vectors stored at the memory based on a second bit value of the key vector, the logic module configured to define a hash value based on a bitwise operation on both the first predefined bit vector and the second predefined bit vector.

14. The apparatus of claim 13, further comprising:
    a shift register associated with the logic module and configured to receive the first bit value of the key vector, the logic module configured to select the first predefined bit vector from the plurality of predefined bit vectors in response to the first bit value of the key vector being moved to a specified location within the shift register.

15. The apparatus of claim 13, further comprising:
    a shift register associated with the logic module and configured to receive the first bit value of the key vector, the logic module configured to define the hash value in response to the first bit value of the key vector being moved to a specified location within the shift register.

16. The apparatus of claim 13, wherein each predefined bit vector from the plurality of predefined bit vectors has a randomly defined bit value.

17. The apparatus of claim 13, wherein the first predefined bit vector has a quantity of bit values equal to a quantity of bit values defining the hash value.

18. The apparatus of claim 13, further comprising:
    a hash database including a policy vector stored in a location associated with the hash value, the policy vector configured to trigger execution of an instruction associated with the data packet.

19. The apparatus of claim 13, wherein the bitwise operation is a bitwise exclusive-or operation.

20. A method, comprising:
receiving a key vector defined based on a portion of a data packet;
selecting a subset of predefined bit vectors from a plurality of predefined bit vectors based on a sequence of bit values defining the key vector, the subset of predefined bit vectors including more than one predefined bit vector from the plurality of predefined bit vectors; and
defining a hash value based on a series of bitwise operations on the subset of predefined bit vectors.

21. The method of claim 20, wherein the selecting includes selecting a first predefined bit vector from the plurality of predefined bit vectors based on a position of a first bit value within the sequence of bit values defining the key vector,
the selecting includes selecting a second predefined bit vector from the plurality of predefined bit vectors based on a position of a second bit value within the sequence of bit values defining the key vector, the position of the first bit value being different than the position of the second bit value.

22. The method of claim 20, wherein the selecting includes selecting each predefined bit vector included in the subset of predefined bit vectors based on a different portion of the sequence of bit values.

23. The method of claim 20, wherein each bitwise operation from the series of bitwise operations is performed on at least a predefined bit vector from the subset of predefined bit vectors.

24. The method of claim 20, wherein each bitwise operation from the series of bitwise operations is triggered in response to a condition associated with a different bit value from the sequence of bit values being satisfied.

25. The method of claim 20, wherein each predefined hit vector from the plurality of predefined bit vectors has at least a randomly defined bit value.

26. The method of claim 20, wherein each bitwise operation from the series of bitwise operations is an exclusive-or bitwise operation.

27. The method of claim 20, wherein the key vector is a first key vector, the subset of predefined bit vectors is a first subset of predefined bit vectors,
the method further comprising:
selecting a second subset of predefined bit vectors from the plurality of predefined bit vectors based on a sequence of bit values defining a second key vector different than the first key vector, the first subset of predefined bit vectors being different than the second subset of predefined bit vectors.

28. The method of claim 20, further comprising:
receiving the portion of the data packet at a multi-stage switch, the portion of the data packet is associated with an address value.

29. The method of claim 20, wherein the hash value is associated with a policy vector configured to trigger execution of an instruction associated with the data packet.

* * * * *